(12) United States Patent
Crespi et al.

(10) Patent No.: US 10,858,291 B2
(45) Date of Patent: Dec. 8, 2020

(54) PROCESS FOR MAKING TILES

(71) Applicant: LAMBERTI SPA, Albizzate (IT)

(72) Inventors: Stefano Crespi, Busto Arsizio (IT);
Davide Ricco', Corlo di Formigine (IT); Paolo Prampolini, Castelnuovo Rangone (IT); Giovanni Floridi, Novara (IT); Giuseppe Li Bassi, Gavirate (IT)

(73) Assignee: Lamberti SPA, Albizzate (IT)

( * ) Notice: Subject to any disclaimer, the term of this patent is extended or adjusted under 35 U.S.C. 154(b) by 201 days.

(21) Appl. No.: 15/302,546

(22) PCT Filed: Apr. 2, 2015

(86) PCT No.: PCT/EP2015/057297
§ 371 (c)(1),
(2) Date: Oct. 7, 2016

(87) PCT Pub. No.: WO2015/155110
PCT Pub. Date: Oct. 15, 2015

(65) Prior Publication Data
US 2017/0029334 A1    Feb. 2, 2017

(30) Foreign Application Priority Data

Apr. 7, 2014   (IT) .............................. VA2014A0013

(51) Int. Cl.
| | | |
|---|---|---|
| C04B 33/13 | (2006.01) | |
| C04B 35/63 | (2006.01) | |
| C04B 33/20 | (2006.01) | |
| C04B 35/636 | (2006.01) | |
| C04B 35/634 | (2006.01) | |
| B01J 2/06 | (2006.01) | |
| B28B 3/00 | (2006.01) | |
| C04B 33/14 | (2006.01) | |

(52) U.S. Cl.
CPC ............. *C04B 33/1315* (2013.01); *B01J 2/06* (2013.01); *B28B 3/00* (2013.01); *C04B 33/131* (2013.01); *C04B 33/1305* (2013.01); *C04B 33/14* (2013.01); *C04B 33/20* (2013.01); *C04B 35/634* (2013.01); *C04B 35/636* (2013.01); *C04B 35/6306* (2013.01); *C04B 35/6365* (2013.01); *C04B 2235/3201* (2013.01); *C04B 2235/349* (2013.01); *C04B 2235/3427* (2013.01); *C04B 2235/444* (2013.01); *C04B 2235/48* (2013.01); *C04B 2235/602* (2013.01); *C04B 2235/61* (2013.01)

(58) Field of Classification Search
CPC .................................................. C04B 33/1315
USPC ............................................................ 264/5
See application file for complete search history.

(56) References Cited

U.S. PATENT DOCUMENTS

| | | | |
|---|---|---|---|
| 5,015,334 A | 5/1991 | Derrick | |
| 5,266,538 A | 11/1993 | Knudson et al. | |
| 5,972,263 A * | 10/1999 | Goodman | C04B 33/04 |
| | | | 106/486 |
| 2007/0131372 A1 | 6/2007 | Plouff et al. | |

FOREIGN PATENT DOCUMENTS

| | | | |
|---|---|---|---|
| EP | 1329484 | | 7/2003 |
| WO | WO 2011/107563 | * | 9/2011 |

OTHER PUBLICATIONS

Benlloch, Single-Fired Ceramic Wall Tile Manufacture, 1992, Int. Ceram. J., p. 111-140 (Year: 1992).*
Manfredini, Preparation of a ceramic floor tile body containing pure bentonite as strengthening agent, Bol. Soc. Esp. Ceram. Vidr. 30 (1991) 1, 5-9 (Year: 1991).*
Tozzi, Binders for Ceramic Bodies, Digital Fire Reference Database, Nov. 22, 2010 (Year: 2010).*

* cited by examiner

*Primary Examiner* — Tabatha L Penny
(74) *Attorney, Agent, or Firm* — Iona Niven Kaiser; Vorys, Sater, Seymour and Pease LLP

(57) ABSTRACT

Ceramic tiles may be prepared employing a process characterized by the addition to the ceramic raw materials of an aqueous slurry comprising a swellable clay of the smectite family, a binder and a water-soluble salt of a monovalent cation. The ceramic raw materials mixed and then subjected to wet grinding to produce a slip. The thus obtained slip is then subjected to spray drying.

13 Claims, No Drawings

PROCESS FOR MAKING TILES

TECHNICAL FIELD

The present disclosure relates to a process for making ceramic tiles characterized by the addition to the ceramic raw materials of an aqueous slurry comprising a swellable clay of the smectite family, a binder and a water-soluble salt of a monovalent cation.

PRIOR ART

The production of ceramic tiles generally involves the following steps:
I) mixing of the ceramic raw materials;
II) wet grinding of the ceramic raw materials;
III) spray drying of the thus obtained ceramic slip;
IV) form green tiles by pressing the powdery intermediate;
V) drying the green tiles;
VI) glazing the upper surface of the dried green tiles;
VII) firing the glazed green tiles.

The ceramic raw materials useful for the preparation of ceramic slips are the typical ceramic raw materials and are of two basic types:
  clayey materials (typically china clays and red vitrifiable clays);
  complementary materials (typically feldspars, feldspathoids, feldspathic sands, quartzes, pegmatites, etc.), having melting and/or inert features.

The purpose of grinding is to effect size reduction of the ceramic raw materials and to homogenise them until a final constant particle-size distribution has been achieved; generally speaking the residue after grinding is around 0.5-10% by weight (% wt) on a 63 microns (230 mesh) sieve, depending on the nature of the ceramic materials.

Wet grinding provides wet grinded ceramic raw materials, also called ceramic slips, containing about 30-40% wt of water.

The subsequent step is spray drying of the ceramic slip. The purpose of spray drying is to achieve a partial evaporation of the water contained in the slip (reduction of water content to 4-7% wt) together with the formation of spheroid particles.

Typical particles size distribution of spray-dried powders for vitrified single-fired tiles is 70-80% wt of particles in the range from 425 to 180 microns.

The purpose of forming the tile body by pressing is to obtain the utmost possible densification of the powders on green tiles, compatibly with problems of black core or degassing, which may turn up during firing; generally speaking, the specific forming pressure for the bodies is around 200-450 Kg/cm$^2$.

Drying is the processing phase which eliminates the residual pressing moisture in the newly formed tiles; the tile bodies coming out of the presses are collected by roller lines and sent to the dryers, provided with inside channels dispensing hot air to the drying zone.

Glazing may be performed using the usual dry or wet application techniques.

Firing is performed in a kiln using pre-defined firing cycles; the firing cycles and temperatures generally fall respectively within the range of 20-60' and 1100-1250° C., depending of the nature of the ceramic masses to be fired and on the size of the tiles themselves.

Forming and drying of the ceramic green tile bodies represents critical operations in the manufacture of the articles. Additives are commonly added in the preceding steps in order to reduce defects generated during pressing and drying. Typical additives are binders and plasticizers.

Binders are added for the specific purpose of cementing together the powdery raw materials and increasing the mechanical resistance of the dried green tiles. They are often organic in nature (such as molasses, ligninsulfonates, starch and derivatives thereof); inorganic binders are also known and used (binder clays).

Plasticizers are added for the specific purpose of increasing the capacity of the slips to change permanently in size and shape during the forming of the tiles. Known organic plasticizer are glycols, such as polyethylene glycols, polyvinyl alcohols and polyacrylates.

Unfortunately the addition of large amount of organic additives increases the organic matter content in ceramic bodies and experience has shown that pressed tile bodies employing too much organic are quite subject to black coring problems.

Also inorganic plasticizers are known. Examples of inorganic plasticizers are specific clays, such as the ball clays or clays belonging to the group of illite-chlorite and/or illite-kaolinite clays, but their use is limited by their relative high cost and periodical shortages.

It is known that swelling clays of the smectite family, such as the bentonites, exhibit plasticity and binding properties and that their addition to the ceramic raw materials, in the manufacture of tiles, will increase both the green and the dry strength. For these reasons bentonites are occasionally combined in small amounts as a powder with the ceramic raw material before grinding. However, there is wide variation in the chemistries of bentonites and, before their addition to the slips, they must be tested in laboratory and carefully controlled on the plant because their strong effect on the viscosity and the rheology characteristics of the ceramic mixtures can produce dramatic results on the grinding process. Moreover bentonites shrink more during drying and thus potentially crack more, so only a limited amount can be added.

It has been now found that a swelling clay of the smectite family, a water-soluble salt of a monovalent cation and specific organic binders may be formulated in liquid form, as a particular pourable aqueous slurry, which can be added without difficulty to the ceramic raw materials. The aqueous slurry of the invention acts as a plasticizer and as a binder, does not cause the problems of black coring, has a predictable behavior and, since it has a little effect on the viscosity of ceramic raw material mixtures or of the ceramic slips, does not require any preliminary laboratory test and increases the strength of both the green and the dried tile bodies. Moreover the slurry, being a easily pourable liquid, may be added not only during the mixing of the raw materials but also during the let down phase after the grinding step without causing formation of gels or residues which would require a further long and difficult filtration step.

Slurries of swelling clays are known and are used, for example, in the papermaking sector.

U.S. Pat. No. 5,0153,34 describes a composition comprising a water dispersible colloidal siliceous material, such as a swelling clay, in intimate association with a low molecular weight water soluble high charge density organic polymer, such as a polyacrylic acid or a polyamine. The polymer concentration is from 0.5 to 25% on the dry weight of the siliceous material.

U.S. Pat. No. 5,266,538 provides an elevated solids aqueous slurry of a smectite clay, e.g. up to 50% by weight of solids, containing an effective concentration of a monovalent salt. The monovalent salt is preferably sodium chloride.

US2007131372 provides aqueous slurries of phyllosilicate-containing material and a sizing agent, having a final Hercules apparent viscosity below 100 cps. These slurries may have a content of from 20 to 55% wt of solid phyllosilicate material. Examples of sizing agents include various forms of rosin, alone or in combination with other materials, such as ligninsulfonates, tall-oil fatty acids, styrene compounds, fluorocarbons, acrylic emulsions and styrene acrylates, stearates and stearic acid. EP1329484 describes a clay slurry comprising a clay of the smectite family, a defined phosphonate additive and water, which is particularly useful as an anti-bleed additive for concrete. The smectite clay slurry contains at least 2% by weight of clay and from about 0.5 to 15% wt based on the weight of the smectite clay of one or more phosphonates.

As far as the Applicant knows, none has described the use of the slurries of the present disclosure in the production of ceramic tiles nor their specific formulation.

DESCRIPTION OF THE INVENTION

It is a fundamental object of the present invention an aqueous slurry comprising:
a) from 5 to 30% by weight of a swelling clay of the smectite family;
b) from 10 to 30% by weight of a binder chosen among lignin sulfonates, naphthalene sulfonate-formaldehyde condensate salts, mono- and oligo-saccharides, water-soluble starches, water-soluble cellulose derivatives, and mixture thereof;
c) from 0.1 to 10% by weight of a water-soluble salt of a monovalent cation.

It is another object of the invention a process for making ceramic tiles comprising the following steps:
I) mixing of the ceramic raw materials;
II) wet grinding of the ceramic raw materials;
III) spray drying of the thus obtained ceramic slip
characterized by the addition during step I) or after step II) and before step III) of from 0.2 to 3% by weight, preferably from 0.4 to 2% by weight, of said aqueous slurry.

DETAILED DESCRIPTION OF THE INVENTION

Preferably the aqueous slurry comprises:
a) from 10 to 20% by weight of a swelling clay of the smectite family;
b) from 15 to 25% by weight of said binder;
c) from 0.5 to 5% by weight of said salt of a monovalent cation.

Usually, the aqueous slurry of the invention comprises from 35 to 84.5% by weight of water.

The swelling clays of the smectite family belong to a well known family of three-layer clay minerals containing a central layer of alumina or magnesia octahedra sandwiched between two layers of silica tetrahedra and have an idealized formula based on that of pyrophillite which has been modified by the replacement of some of the $Al^{+3}$, $Si^{+4}$, or $Mg^{+2}$ by cations of lower valency to give an overall anionic lattice charge. The swelling clays of the smectite family include montmorillonite, which includes bentonite, beidellite, nontronite, saponite and hectorite. The swelling clays usually have a cation exchange capacity of from 80 to 150 meq/100 g dry mineral and can be dispersed in water relatively easily.

For use according to the present invention, the swelling clay of the smectite family is preferably in the sodium or lithium form, which may occur naturally, but is more frequently obtained by cation exchange of naturally occurring alkaline earth clays, or in the hydrogen form which is obtainable by mineral acid treatment of alkali metal or alkaline earth metal clays. Such sodium, lithium or hydrogen-form clays generally have the property of increasing their basal spacing when hydrated to favor the phenomenon known as swelling.

For the realization of the present invention, bentonite is the preferred swelling clay of the smectite family, sodium bentonite is particularly preferred.

The binders b) suitable for the realization of the present invention are ligninsulfonate, naphthalene sulfonate-formaldehyde condensate salts, mono- and oligo-saccharides, water-soluble starches, water-soluble cellulose derivatives, such as carboxymethyl cellulose and hydroxyethyl cellulose, and mixture thereof. Examples of mono- and oligo-saccharides are sugars, such as glucose and sucrose; sugar alcohols, such as sorbitol; dextrins and maltodextrins. These binders are commonly used in the field and well known to the expert in the art.

Particularly preferred binders for the realization of the invention are sodium or potassium ligninsulfonates.

Ligninsulfonates are a by-product of the production of wood pulp. As the organic lignin molecule combines with strongly polar sulfonic acid groups during sulfite pulping, ligninsulfonates are readily soluble in water in the form of their sodium, calcium or ammonia salts. Ligninsulfonates are available as yellowish powders having variable compositions and also variable molecular dimensions. A typical weight average molecular weight of the ligninsulfonates is about 30,000 dalton (Da) and its typical number average molecular weight is about 3,000 dalton.

Naphthalene sulfonate-formaldehyde condensate salts, also called NSF, have been known for some time and have been fully described also as dispersing agents in different sectors. In general these materials are made by condensing molten naphthalene with fuming sulfuric acid to form naphthalene sulfonic acid derivatives having varying position isomers. The sulfonic acid derivative is then condensed with water and formaldehyde at temperatures of about 90° C. and thereafter converted to a salt by the addition of alkali metal or ammonium hydroxides or carbonates. The weight-average molecular weight of the naphthalene sulfonate formaldehyde condensate salts, suitable for the realization of the present invention, is preferably around 10,000 Da.

The carboxymethyl cellulose suitable for the realization of the present invention can be chosen among those commonly used in the ceramic field and known to those expert in the art. The carboxymethyl cellulose preferred for the realization of the present invention has degree of substitution comprised between 0.5 and 1.5, more preferably between 0.6 and 1.2. Preferably its Brookfield® LVT viscosity, at 2% wt in water, 60 rpm and 20° C., is from 5 to 300 mPa·s, more preferably from 5 to 50 mPa·s.

Preferred binders are ligninsulfonates, naphthalene sulfonate-formaldehyde condensate salts, sugars, sugar alcohols, carboxymethyl cellulose, and mixture thereof.

The aqueous slurry comprises also a water soluble salt of a monovalent cation c), which reduces the swelling capacity of the smectite clay and lowers the viscosity of the slurry and subsequently of the ceramic slips. Salt containing divalent or higher valency cations (for instance calcium) can be used in some instances but these divalent ions tend to exchange with the monovalent ions that are present in the swellable clay initially and this can inhibit the subsequent swelling of the clay. It is generally preferred therefore that the cation of the salt is monovalent, for example ammonium or alkali metal. Examples of useful salts are ammonium salts (in particular $NH_4$, tetra-$C_1$-$C_4$-alkyl ammonium and tetra-$C_1$-$C_4$-alkenyl ammonium salts, in which one or more of the alkyl or alkenyl groups is substituted by an —OH group) or alkali metal salts of chloride, bromide, phosphate (monobasic, dibasic and tribasic phosphate) and mixtures thereof. Specific examples are sodium or potassium chloride, sodium or potassium bromide, monobasic sodium or potassium phosphate, dibasic sodium or potassium phosphate, tetraalkyl ammonium chloride, choline chloride and mixtures thereof.

Preferably the monovalent cation is sodium, potassium or choline.

The salt is preferably sodium chloride, potassium chloride and choline chloride, more preferably potassium chloride.

In a preferred embodiment the aqueous slurry of the invention also comprises from 0.5 to 5% by weight, preferably from 1 to 3% by weight, of a dispersant, chosen among those commonly used in the field. Examples of dispersant are (meth)acrylic acid polymers, usually provided as sodium salt; phosphates and polyphosphates, such as sodium tripolyphosphate; sodium metasilicate; sodium disilicate; liquid sodium silicate; and mixtures thereof. Particularly preferred dispersants are (meth)acrylic acid polymers with a weight average molecular weight below 20,000 Da, and preferably below 10,000 Da, for instance from 1,000 to 6,000 Da.

Common ceramic additives can be also present in the aqueous slurry of the invention. Example of additives are antifoams, perfumes, preservatives, dyes and the like.

The aqueous slurry is prepared by first dissolving in water the salt c), the binder b) and the optional additives and thereupon dispersing in the solution the swellable clay of the smectite family a). The clay-binder mixture is stirred with minimum shear, preferably as the clay is added. It has been found that the lower the shear of mixing, the higher the solids content that can be reached. Any mixing device capable of producing low-shear mixing can be employed.

Usually, the final aqueous slurry has a Brookfield viscosity (25° C., 20 rpm) of below 3,000 mPa·s, preferably from 500 to 1,500 mPa·s.

It is important to note that the slurries of the present invention have low viscosity and high solids content. They are also stable and characterized by prolonged shelf lives.

The aqueous slurries described above can be used for making ceramic tiles according to the process of present invention. As already mentioned the slurries can be added in step I).

According to this embodiment, the combination of the ceramic raw materials and the aqueous slurry is typically accomplished by mixing carefully the ceramic raw materials and the other additives such as deflocculants with the slurry to form a homogeneous mixture.

The mixture of the ceramic raw materials is then subjected to wet grinding. This step may be performed using either the continuous or the discontinuous process.

At the end of the grinding, the slips are sieved and sent to storage vats, from where they are pumped to an atomizer. The aqueous slurries of the invention can be also added to the slips any moment between grinding and spray-drying, even directly in the transfer line between the storage vats and the atomizer.

In step III), the slips are dried as they are heated in the atomizer by a rising hot air column, forming small, free flowing granules that result in a powder suitable for forming.

The process for the production of ceramic tiles further comprises the following steps: pressing the powdery intermediate to form green tiles, drying the green tiles, glazing the upper surface of the dried green tiles and finally firing the glazed tile bodies. These subsequent steps for the preparation of ceramic tiles can be accomplished by conventional techniques and procedures.

The tile making process of the invention has several advantages compared to prior art processes of making ceramic tiles using directly a swellable clay of the smectite family. In particular, the performance is superior to that which is obtainable using the corresponding smectite in powder and without the inconvenience of having to handle powder.

The process of the invention is suitable for the production of any kind of ceramic tile, such as wall tiles, floor tiles, stoneware, porcelain stoneware, rustic stoneware, earthenware tile, mosaic tiles, which can be both single and double fired.

The following non-limiting examples illustrate exemplary aqueous slurries and process using the slurries in accordance with the present invention.

EXAMPLES

Examples 1-3

Three aqueous slurries according to the invention were prepared with the commercially available components reported in Table 1.

TABLE 1

| Component (% w/w) | Example 1 | Example 2 | Example 3 |
|---|---|---|---|
| KCl | 0.4 | 0.4 | 1.5 |
| Sodium Ligninsulfonate | 25 | — | 15 |
| NSF | — | 20 | — |
| Bentonite | 20 | 30 | 20 |
| Reotan HS | — | — | 5.0 |
| Biocide | 0.1 | 0.1 | 0.1 |
| Perfume | 0.3 | — | 0.2 |
| Dye | 0.1 | 0.1 | 0.1 |
| Antifoam | — | — | 0.1 |
| Water | to 100 | to 100 | to 100 |

The slurries were prepared according to the following procedure:
dissolve the salt in water;
add the binder;
dissolve under stirring, then add the dispersant and the other additives (if any);
after 5 minutes, gradually pour under stirring the bentonite into the mixture;
after 10 minutes of homogenization, sieve the slurry on a 100 micron sieve.

Dissolution Test

The effect of the slurries was evaluated on a ceramic raw material mixtures before grinding. The mixtures were prepared with the commercially available ceramic raw materials reported in Table 2 for Tile 4.

The effect of the suspensions were evaluated by determining the Ford viscosity (ASTM Standard Method 01200-10) on a mixture prepared without any additive (blank), on a mixture prepared with 1% by weight of the slurry of Example 3 (Example 3A) and on a mixture prepared with 0.2% by weight of the same bentonite powder of Example 3 (Example B, with the same amount of bentonite of the slurry of Example 3A). The mixtures were homogenized by means of high speed mechanical stirrer equipped with a eight blades impeller, working at 320 rpm for 10 minutes.

The following results were obtained:

|  | Blank* | Example 3A | Example B* |
|---|---|---|---|
| Ford Viscosity (sec) | 27 | 28 | >60 |

*Comparative

The results show the excellent stability of the viscosity of the mixture of ceramic raw materials comprising the slurry of Example 3.

The use of the slurries according to the invention allows to avoid high viscosities and the problems that they would create, such as difficulties in grinding and in moving the slips through the various steps of the process. An analogous test was performed on ceramic slips obtained by grinding the ceramic raw materials described in Table 2 for Tile 1.

The test was performed on a slip without additive (blank), a slip with 1% by weight of slurry of Example 3 (Example 3B) and a slip with 0.2% by weight of the same bentonite powder of the Example 3 (Example C, with the same amount of bentonite of the slurry of Example 3B). The mixtures were homogenized by means of high speed mechanical stirrer equipped with a eight blades impeller, working at 320 rpm for 10 minutes.

After homogenization, 250 g of each slip were screened on a tared 63 microns ASTM sieve (100 mesh) and the amount of undissolved material (residue) was determined by weight difference after drying in oven at 105° C. for 2 hours.

The following results were obtained:

|  | Blank* | Example 3B | Example C* |
|---|---|---|---|
| Residue (% wt) | 0.4 | 0.4 | 1 |

*Comparative

The results show the mixture of ceramic raw materials containing the slurry of Example 3 has a lower content of residue.

The presence of high concentrations of residues creates problems in the subsequent steps of the process and forces the user to filtrate the slip a second time before the spray-drying.

Strength Test

The performances of the slurries of the invention were determined on tiles bodies prepared with the commercially available ceramic raw materials reported in Table 2, wherein (parts) means (parts by weight) and (% wt) means the percentage by weight of the

TABLE 2

| Raw Materials | Tile 1 | Tile 2 | Tile 3 | Tile 4 | Tile 5 | Tile 6 | Tile 7 |
|---|---|---|---|---|---|---|---|
| German Clay (parts) | 40 | 40 | 40 | 23 | 23 | 23 | 23 |
| Quartz (parts) | 60 | 60 | 60 | — | — | — | — |
| German Kaolinitic clay (parts) | — | | | 8.0 | 8.0 | 8.0 | 8.0 |
| Italian Clay (parts) | | | | 7.4 | 7.4 | 7.4 | 7.4 |
| Feldspar (parts) | | | | 28 | 28 | 28 | 28 |
| Aplite (parts) | | | | 12.5 | 12.5 | 12.5 | 12.5 |
| Sand (parts) | | | | 21.1 | 21.1 | 21.1 | 21.1 |
| Example 1 (% wt) | | | | 0.3 | 0.6 | — | — |
| Example 2 (% wt) | | | | — | — | 0.3 | 0.6 |
| Example 3 (% wt) | 0.3 | 0.6 | 0.9 | | | | |

The slurries of Examples 1-3 were added to the ceramic slips obtained by grinding the ceramic raw materials and carefully homogenized using a mechanical stirrer.

After homogenization, the slips were conditioned at 75-80° C. in oven for one night and grinded again to get particles with size below 0.75 mm.

At the end of the grinding process, the water content of the ceramic slips was brought to about 6% by weight.

Green tile bodies (5 cm×10 cm, 0.5 cm thick) were prepared by means of a laboratory hydraulic press (Nannetti, Mod. Mignon SS/EA) applying a pressure of about 300 Kg/cm$^2$ for wall tile bodies (Tile 1-3) and about 400 Kg/cm$^2$ for standard gres tile bodies (Tile 4-7).

Comparative green tiles were prepared with the same procedure and with the sole ceramic raw materials.

The modulus of rupture (MOR) of the green tile bodies was determined according to the International Standard Test Method ISO 10545-4, using a laboratory fleximeter (Nannetti, Mod. FM96).

The MOR of the dry tile bodies was determined on the remaining tile bodies after drying in oven for one night at 110° C.

The modulus of rupture is an index of the strength of the tile bodies. The results expressed as % increase of the strength of the tile bodies prepared according to the invention compared to the strength of the comparative tile bodies are reported in Table 3.

TABLE 3

|  | Tile 1 | Tile 2 | Tile 3 | Tile 4 | Tile 5 | Tile 6 | Tile 7 |
|---|---|---|---|---|---|---|---|
| % Green Strength | +14.1 | +35.3 | +70.6 | +11.1 | +13.1 | +5.0 | +6.0 |
| % Dry Strength | +41.8 | +49.1 | +75.3 | +19.4 | +43.5 | +11.4 | +16.8 |

The invention claimed is:

1. A process for making ceramic tiles comprising:
   mixing ceramic raw materials;
   wet grinding the ceramic raw materials to produce a slip;
   spray drying the thus obtained slip to produce a powder; and
   pressing the powder to form green tiles,
   wherein from about 0.2 to about 3% by weight of an aqueous slurry is introduced to the slip prior to the spray drying, the aqueous slurry comprising:
   a) from about 5 to about 30% by weight of a swelling clay of the smectite family;
   b) from about 10 to about 30% by weight of a binder chosen among lignin sulfonates, naphthalene sulfonate-formaldehyde condensate salts, mono- and oligo-saccharides, water-soluble starches, water-soluble cellulose derivatives and mixture thereof;
   c) from about 0.1 to about 10% by weight of a water-soluble salt of a monovalent cation; and
   d) from 35 to 84.5% by weight of water,
   and said aqueous slurry being prepared by:
   dissolving the salt c) in water to form a first solution, and adding to the first solution the swelling clay of the smectite family a), the binder b), and optional additives.

2. The process of claim 1 wherein from about 0.4 to about 2% by weight of the aqueous slurry is introduced.

3. The process of claim 1, wherein the water-soluble slat of a monovalent cation is one or more selected from a group consisting of ammonium salts and alkali metal salts of chloride, bromide, and phosphate.

4. The process of claim 1, wherein the viscosity of the aqueous slurry has a Brookfield viscosity (25° C., 20 rpm) is below 3,000 mPa*s.

5. The process of claim 1, further comprising homogenizing the aqueous slurry prior to introduction to the slip.

6. The process of claim 1, further comprising homogenizing and sieving the aqueous slurry prior to introduction to the ceramic raw materials or the slip.

7. The process of claim 1, wherein the aqueous slurry comprises a) from about 10 to about 30% by weight of a swelling clay of the smectite family.

8. A process for making ceramic tiles comprising:
mixing ceramic raw materials;
wet grinding the ceramic raw materials to produce a slip;
spray drying the thus obtained slip to produce a powder; and
pressing the powder to form green tiles,
wherein from about 0.2 to about 3% by weight of an aqueous slurry is introduced to the ceramic raw materials or the slip prior to the spray drying, the aqueous slurry comprising:
   a) from about 5 to about 30% by weight of a swelling clay of the smectite family;
   b) from about 10 to about 30% by weight of a binder chosen among lignin sulfonates, naphthalene sulfonate-formaldehyde condensate salts, mono- and oligo-saccharides, water-soluble starches, water-soluble cellulose derivatives and mixture thereof;
   c) from about 0.1 to about 10% by weight of a water-soluble salt of a monovalent cation; and
   d) from 35 to 84.5% by weight of water,
and said aqueous slurry being prepared by:
dissolving the salt c) in water to form a first solution, and adding to the first solution the swelling clay of the smectite family a), the binder b), and optional additives and
homogenizing the aqueous slurry prior to introduction to the ceramic raw materials or the slip prior to spray drying.

9. The process of claim 8, wherein the aqueous slurry is introduced into the raw materials prior to or during the mixing of the ceramic raw materials.

10. The process of claim 9, wherein from about 0.4 to about 2% by weight of the aqueous slurry is introduced.

11. The process of claim 8, wherein the aqueous slurry is introduced into the slip prior to the spray drying of the slip.

12. The process of claim 11, wherein from about 0.4 to about 2% by weight of the aqueous slurry is introduced.

13. The process of claim 8, wherein from about 0.4 to about 2% by weight of the aqueous slurry is introduced.

* * * * *